United States Patent [19]

Heidenreich

[11] Patent Number: 4,645,472
[45] Date of Patent: Feb. 24, 1987

[54] TORQUE LIMITING CLUTCH

[75] Inventor: David C. Heidenreich, Middleburg Heights, Ohio

[73] Assignee: Power Transmission Technology, Inc., Copley, Ohio

[21] Appl. No.: 346,296

[22] Filed: Feb. 5, 1982

Related U.S. Application Data

[63] Continuation-in-part of Ser. No. 238,878, Mar. 6, 1981.

[51] Int. Cl.⁴ .............................................. F16D 7/02
[52] U.S. Cl. ................................... 464/48; 192/30 W
[58] Field of Search ............ 74/617; 192/30 W, 56 R; 411/393; 464/30, 46, 48

[56] References Cited

U.S. PATENT DOCUMENTS

| | | | |
|---|---|---|---|
| 2,540,997 | 2/1951 | Schmitter | 464/48 X |
| 2,857,750 | 10/1958 | Fox | 464/10 X |
| 2,953,911 | 9/1960 | Tigerman | 464/48 X |
| 3,122,903 | 3/1964 | Ramsden | 464/48 |
| 3,600,877 | 8/1971 | McCrary | 464/48 X |
| 3,786,776 | 1/1974 | Buthe et al. | 192/30 W X |
| 3,984,999 | 10/1976 | Kopp | 464/48 X |
| 4,401,426 | 8/1983 | Heidenreich | 464/48 X |

FOREIGN PATENT DOCUMENTS

| | | | |
|---|---|---|---|
| 2846884 | 6/1979 | Fed. Rep. of Germany | 464/48 |
| 774720 | 5/1957 | United Kingdom | 464/48 |

*Primary Examiner*—Stuart S. Levy
*Assistant Examiner*—Daniel P. Stodola
*Attorney, Agent, or Firm*—Oldham, Oldham & Weber Co.

[57] ABSTRACT

A torque limiting clutch having one or more friction surfaces placed under pressure by pre-compressed helical springs employed for eliminating adjustment and compensating for wear of the clutch during use. In one embodiment of the invention, the springs are pre-compressed on pins for ease of assembly. An embodiment of the invention also provides for axial locking of input shafts centrally of the input hub, while including an indicator of friction surface wear.

12 Claims, 6 Drawing Figures

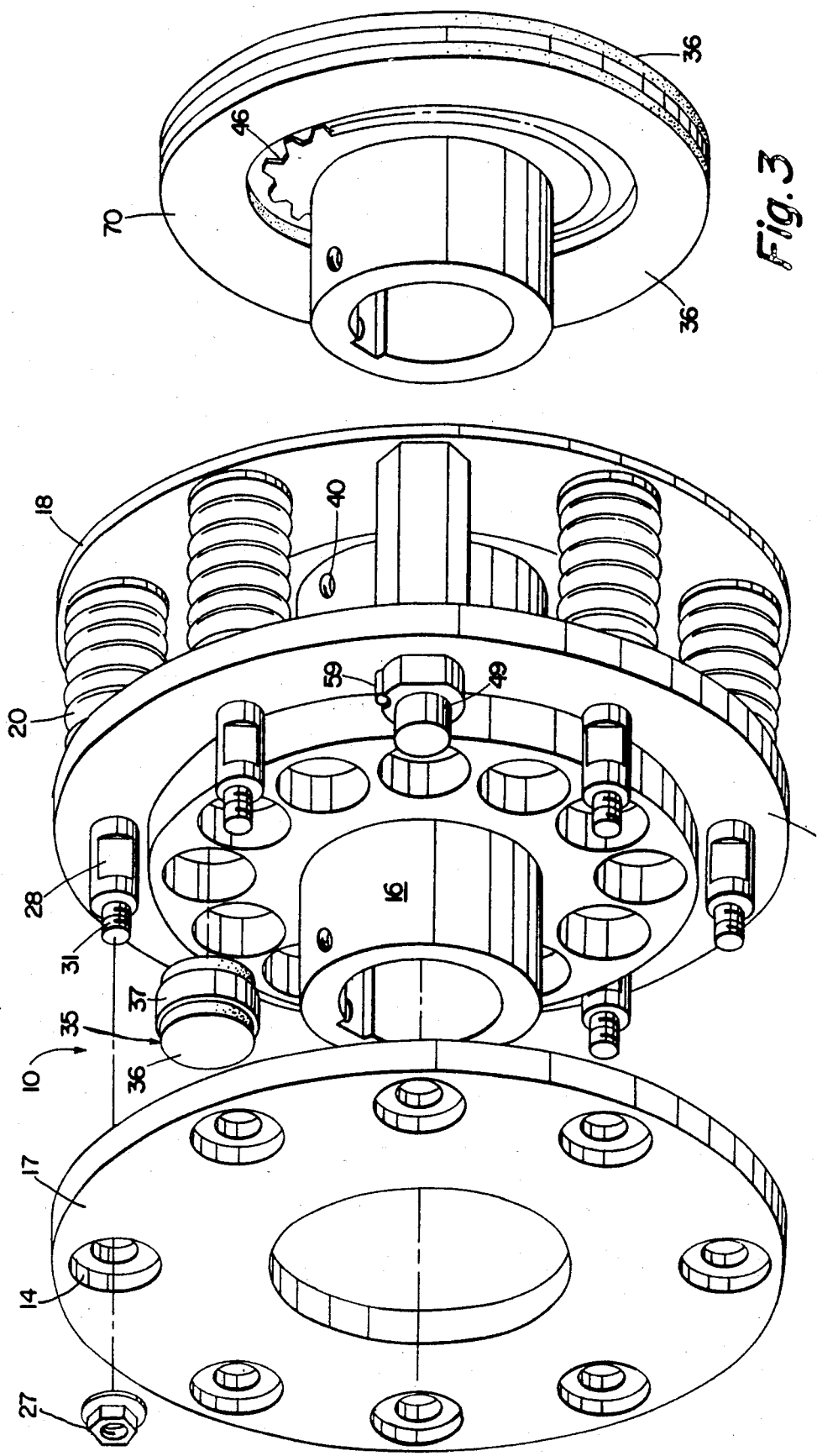

TORQUE LIMITING CLUTCH

CROSS-REFERENCE TO RELATED APPLICATION

This is a continuation-in-part application of copending patent application Ser. No. 238,878, filed 3/6/81, for "Torque Limiting Clutch."

BACKGROUND OF THE INVENTION

This invention relates to torque limiting clutches adapted for general application with power transmission machinery and particularly to torque limiting clutches having axial pressure engagement of the friction surface by helical springs such that no adjustment is required at installation or as the friction surface wears down.

It is common practice in the machinery drive art to provide spring loaded, friction-type torque limiting clutches in the drive train to prevent damage from extremely high shock loads or machinery jams. In operation, machinery such as mining machinery, transmits a shock load through the drive to a clutch that slips and thus limits the shock load within the drive machinery. Though prior art torque limiting clutches have gained commercial acceptance, they exhibit certain drawbacks. The proper torque setting is dependent upon the skill of the assembler in adjusting the spring load on the friction surface. Also, after a period of functioning to relieve overload shock, the friction surfaces would wear and thus a readjustment of the load springs would be required to compensate for the wear and maintain the necessary pressure on the friction surfaces to properly operate the drive. If wear proceeds without adjustment, clutch torque is apt to diminish to the point that common friction-type torque limiters will slip and the friction surfaces will burn, damaging the clutch and losing the ability to function. Further, when the prior art torque limiting clutches are readjusted for wear, they are often over-adjusted too tightly and thus the shock load protection capability is lost which results in severe damage to the drive machinery.

Previously known torque limiting clutches have generally been bulky, unnecessarily adding size, weight, and complexity to the associated machinery. Further, such clutches have provided means for locking input drive shafts only at an end of the input hub, failing to accommodate the insertion of short shafts from either end of the hub. These known clutches have also failed to provide a wear indicator to advise the operator when normal acceptable wear of the friction surfaces has been exceeded. Finally, with all of the shortcomings above, the prior art clutches have remained of complex design, not given to ease of assembly or repair.

This invention is directed to a novel torque limiting clutch that overcomes the problems previously experienced.

SUMMARY OF THE INVENTION

In light of the foregoing, it is an object of the present invention to provide an improved torque limiting clutch that requires no adjustment for friction surface wear.

It is another object of the present invention to provide an improved torque limiting clutch that requires no adjustment upon assembly and installation.

It is yet another object of this invention to provide an improved torque limiting clutch of the single or multiple disk type that requires no adjustment upon assembly and installation nor during its wear life.

An additional object of the present invention is to provide an improved torque limiting clutch which is of small physical size while exhibiting significant torque limiting capabilities.

Still another object of the present invention is to provide an improved torque limiting clutch which provides locking means centrally located on the input hub assembly to accommodate receipt of various sizes of input shafts from either side of the clutch.

Another object of the present invention is to provide an improved torque limiting clutch which includes a wear indicator in operative engagement with the friction wear surface to advise the operator of the state of wear thereof.

Yet an additional object of the invention is to provide an improved torque limiting clutch which is simple to construct and maintain, while being highly efficient and effective in operation.

The foregoing and other objects of the invention which will become apparent as the detailed description proceeds are achieved by a torque limiting clutch, comprising: an input hub; an output hub; a friction disk and pressure plate in interconnection between said input and output hubs: and a plurality of spring assemblies in forceful engagement between said input hub and said pressure plate, each said spring assembly comprising: a pin having an enlarged head at a first end thereof: a spring maintained upon said pin: and retaining means at a second end of said pin for compressively retaining said spring upon said pin.

BRIEF DESCRIPTION OF THE DRAWINGS

The invention will be more fully understood from the following detailed description thereof when considered in connection with the accompanying drawings wherein the invention is illustrated by way of example and in which:

FIG. 2 is a perspective view of the invention;

FIG. 3 is a perspective view of a disk-type frictional surface employed in a second embodiment of the invention;

DETAILED DESCRIPTION

Figure 1:
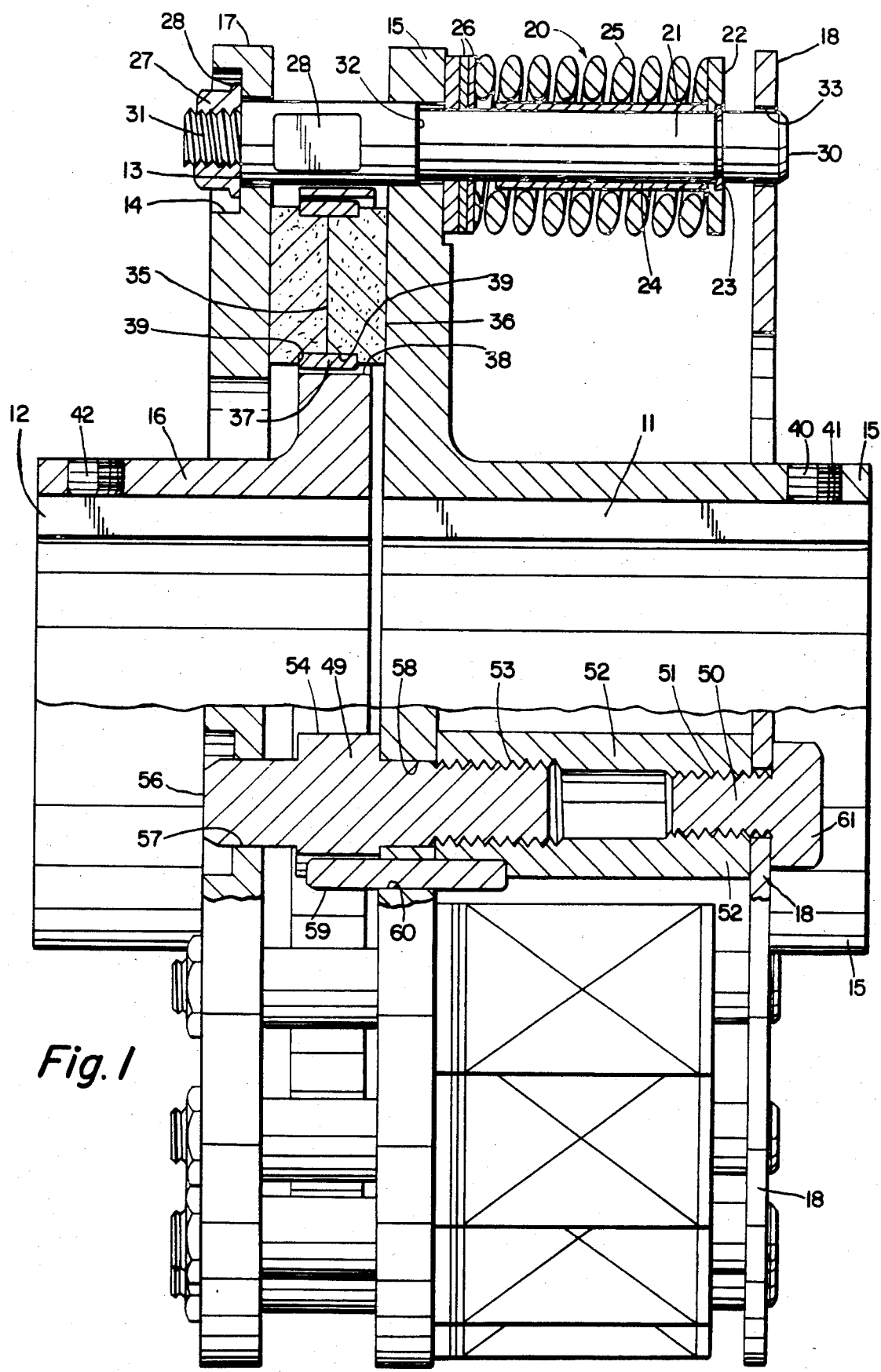
FIG. 1 is a longitudinal cross-sectional view in part of a torque limiting clutch according to this invention.

Referring to the drawings and more particularly to FIGS. 1 and 2, reference numeral 10 generally designates the torque limiting clutch according to one embodiment of this invention. Input hub 15 is suitably keyed 11 to an input drive shaft for transmitting rotary motion to the output hub 16 which is also suitably keyed 12 to an output drive shaft. Input key 11 is held in place by means of a setscrew turned into a threaded hole 40 in the input hub 15 and output hub 16 is similarly arranged for a setscrew to be inserted into threaded hole 42. Instead of keying, it is understood the input hub 15 and output hub 16 can be connected directly to an input and output shaft by splines or other methods well known in the art. The clutch is preferably made of cast iron but other metals having suitable strength may be used.

Output hub 16 has holes drilled in the disk portion at 38 spaced symmetrically around the disk portion at the same radius for receiving friction pucks 35. The friction pucks are recessed 39 around the outer periphery for receiving ring-shaped bushing 37. The friction pucks 35 are made of typical clutch wear resistant material well known in the art while bushings 37 are typically made of a tough high temperature plastic bearing material such as reinforced Teflon.

The bushings 37 fit within holes 38 with a slight clearance to permit compensating for axial, angular or radial misalignment between input and output shafts. This is the important advantage in using friction pucks 35 for connecting the input drive to the output drive. However, it can be understood that a singular friction disk 70 as shown in FIG. 3 can be employed or multiple disks may be used as further embodiments of the invention.

Friction pucks 35 have friction surfaces 36 which are engaged with surfaces on pressure plate 17 and input hub 15. Pressure plate 17 is urged into engagement with friction surface 36 by a spring 25 of spring bolt assembly 20. Spring bolt assembly 20 includes a bolt 21 around which is positioned a helical spring 25 between thrust washers 22. Retaining ring 23 holds one thrust washer 22 in place on the bolt 21 and permits spring 25 to be compressed against it.

An insulator bushing 24 made of preferably a Phenolic plastic composition is positioned on bolt 21 within spring 25 to protect against excessive heat transfer from bolt 21 to spring 25 which would damage the resiliency of spring 25. Bolt 21 passes through input hub 15 and pressure plate 17 to a threaded 31 end. The threaded 31 end applies spring 25 force to the ring-shaped pressure plate 17 by the flange 28 of locknut 27. The locknut 27 is seated 13 at the bottom of the threaded 31 end of the bolt 21. Locknut 27 is tightened by turning a socket wrench while holding the bolt 21 from turning by applying an open-end wrench to machined flats at 28 on the bolt 21. The spring bolt assembly 20 alignment is maintained by inserting the bolt 21 through a hole 33 in retainer disk 18. Since each spring 25 will have variable characteristics due to manufacturing tolerances insulator shims 26 are used in the amounts required accordingly to attain uniform force on each assembly 20. By using insulating material such as compressed asbestos shims, the spring 25 is further protected from heat generated by the friction surface 36 when in operation. Bolt 21 is machined in two different diameters to form a stop shoulder as shown at 32. Thus, as friction surfaces 36 wear, precompressed spring 25 will expand against thrust washer 22 along bolt 21 until reaching stop shoulder 32. This will automatically limit the wear of friction surfaces 36 and when excessive slipping and loss of drive power is noted, it will serve as an indicator to replace the friction pucks 35. The automatic limiting by shoulder stop 32 prevents damage to the torque limiter.

A torque pin 49 is threaded 53 into a hexagonal spacer nut 52 that extends between input hub 15 and retainer disk 18. Bolt 50 is tightened into threads 51 of spacer nut 52 against the seat of bolt head 61 and retainer disk 18. Torque pin 49 extends through openings 58 in input hub 15, and 57 in pressure plate 17. In the preferred embodiment, two torque pins 49 are employed to hold retainer disk 18 in place and to transmit one half of the drive power from input to pressure plate 17. Torque pin end 56 extends through pressure plate 17 as shown at 57 to input rotary drive power through the friction surfaces 36 to output hub 16. After torque pin 49 is assembled in spacer nut 52 and seated against input hub 15 as shown at 58, a hole 60 is drilled for installing roll pin 59 to pivotally lock torque pin 49 and Hex spacer nut 52 in place.

Figure 4:
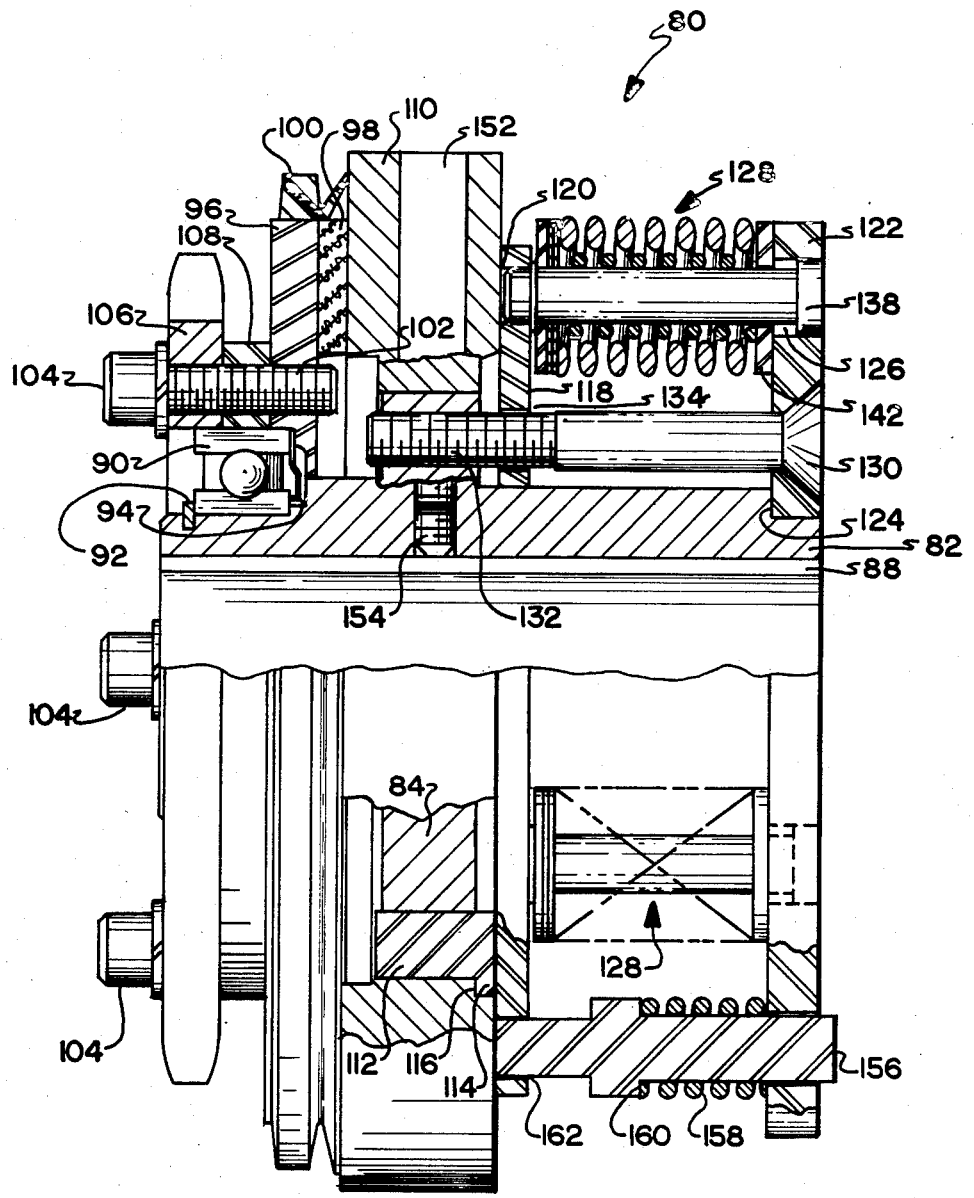
FIG. 4 is a partial sectional view of a compact torque limiting clutch made in accordance with the teachings of the invention.
Figure 5:
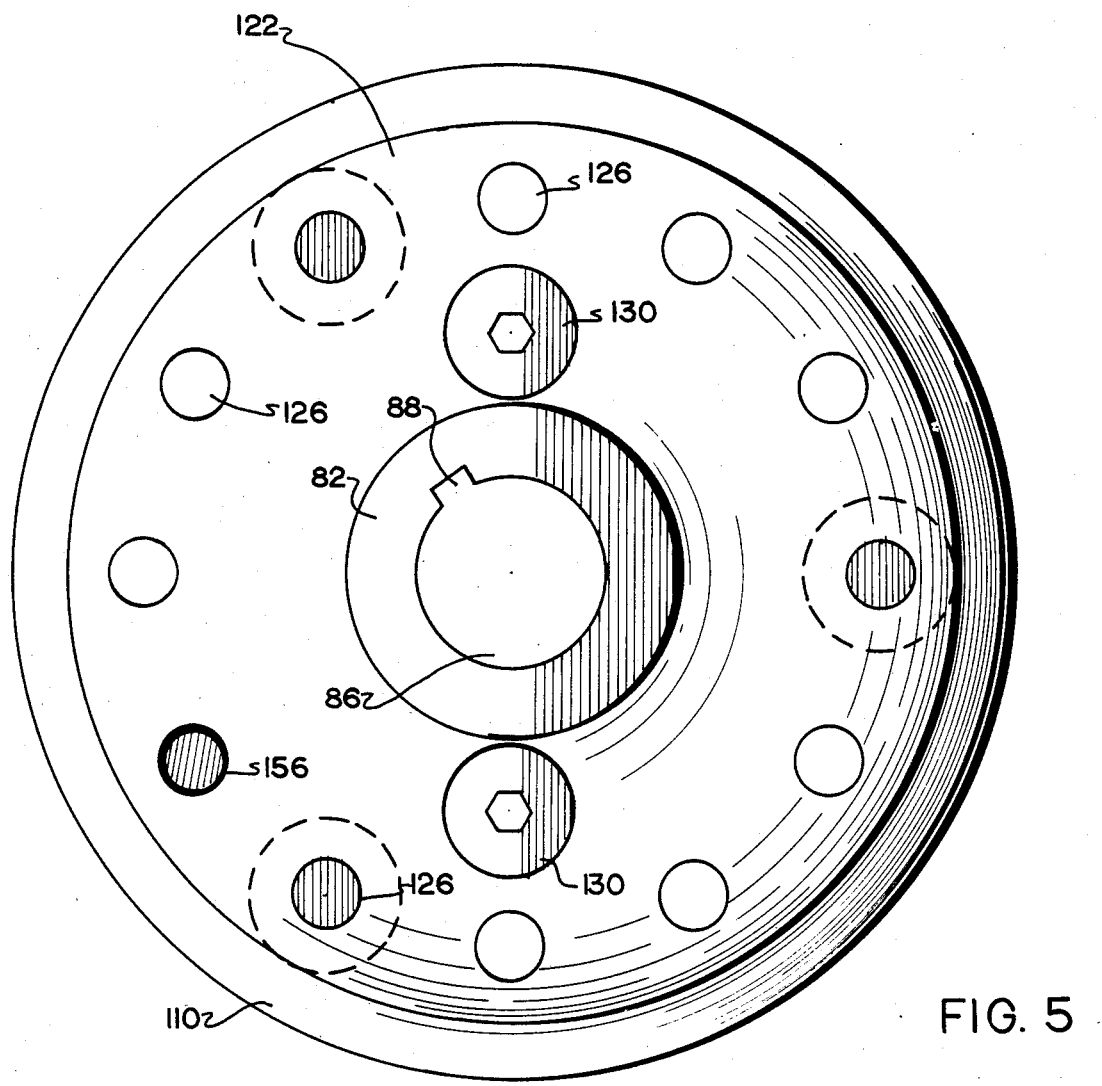
FIG. 5 is an end plan view of the clutch assembly of FIG. 4.
Figure 6:
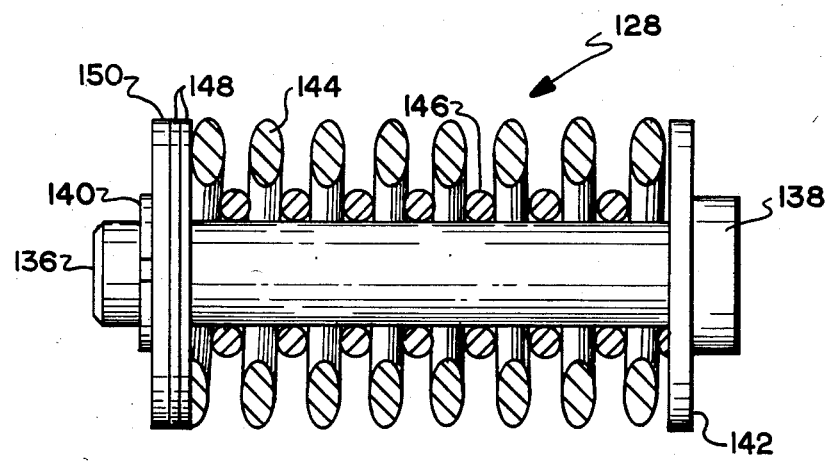
FIG. 6 is a front elevational view of a spring pin assembly employed by the clutch of FIGS. 4 and 5.

In FIGS. 4-6, there is provided a detailed illustration of the structure of yet another embodiment of the torque limiting clutch assemblies of the invention. As shown in FIG. 4, a compact torque limiting clutch is designated generally by the numeral 80. The input hub of the clutch 80 consists of an axial portion 82 which has a circumferential flange portion 84 extending thereabout at a nearly central location thereof. A bore 86, best shown in FIG. 5, passes completely through the axial portion 82 such that an input drive shaft from an appropriate source may enter the axial portion of the hub from either side of the clutch assembly 80. The bore 86 is keyed as at 88 for transferring rotational force from the shaft to the hub.

A sealed bearing assembly 90 is affixed at one end of the axial portion 82 of the input hub. A keeper or retaining ring 92 is received in an appropriate groove at an end of the axial portion 82 to lock the sealed bearing assembly 90 against a shoulder on the axial hub portion 82 as illustrated. A shield 94 extends about the back side of the bearing 90 near the shoulder to prevent bearing grease from contacting the friction surface of the clutch.

Mounted upon the bearing assembly 90 and rotatable therewith is a friction disk 96 having a friction surface 98 bonded thereto. A V-ring seal 100 encircles the disk 96 and material 98, maintaining contacting engagement with a surface of the pressure plate 110. The seal 100 serves to prevent foreign matter in an adverse environment from affecting the friction material 98, thus altering the frictional coefficient associated therewith, The friction disk 96 is characterized by a plurality of threaded holes 102 uniformly spaced thereabout at equal radial distance from the center of the disk 96. An equal plurality of cap screws 104 then serves to secure a sprocket 106 in engagement with the friction disk 96, the sprocket 106 also being received upon and rotating with the bearing 90. A spacer 108 is interposed between the disk 96 and sprocket 106 to maintain a tight fixed relationship therebetween.

It will thus be seen that the output hub assembly of the invention comprises the elements 90-108 described above. While the embodiment shown in FIG. 4 shows the output drive means to be a sprocket 106, it will be appreciated that various types of output drive means could be affixed to the plate 96 by threaded engagement of the cap screws 104 with the holes 102. It will be apparent to those skilled in the art that a gear, belt drive, or shaft coupling could, for example, be so affixed.

With continued reference to FIGS. 4 and 5, it will be seen that an annular pressure plate 110 is received over the circumferential flange portion 84 of the input hub and is keyed thereto by means of a plurality of keys 112. The keys 112 include a step cut protrusion 114 to ride on a shoulder or lip 116 formed in the pressure plate 110. In standard fashion, the rotational forces which are imparted from the input shaft to the flange portion 84 are transferred by the keys 112 to the pressure plate 110, causing the pressure plate 110 to rotate therewith. Transfer of this rotational movement to the output hub assembly of elements 90-108, described above, is dependent upon the forceful frictional engagement maintained between the pressure plate 110 and the friction material 98 of the disk 96. This forceful engagement is attained by the spring pins and related assemblies discussed directly below.

An annular spring guide plate 118 is received over the axial portion 82 of the input hub and is provided with a plurality of holes 120 equally and circumferentially spaced thereabout. In similar fashion, an annular back plate 122 is received over the axial portion 82 in abutting engagement with the shoulder 124. The back plate 122 has a plurality of holes 126 circumferentially spaced thereabout and in center registration with the holes 120.

A plurality of spring pin assemblies 128, to be discussed in detail hereafter, are interposed between aligned holes 120,126. As in the previously discussed embodiments, the number of spring pin assemblies 128 interposed between the plates 118,122, determines the break-away torque at which the pressure plate 110 will overcome the frictional forces existent at its interface with the friction material 98. In other words, the characteristic torque of the torque limiting clutch 80 is determined by the number of spring assemblies 128 utilized in the system. Of course, it is preferable that the spring pin assemblies 128 be balanced about the axis of the unit 80.

A plurality of flathead cap screws are received by counter bores in the back plate 122, pass through the unthreaded bore 134 in the spring guide plate 118, and are then threadedly engaged with the bores 132 in the circumferential flange portion 84 of the input hub. While the illustration of FIGS. 4 and 5 depicts two screws 130, it will be appreciated that more screws may be used to increase stability and rigidity in the system. In any event, the back plate 122 becomes fixed with respect to the input hub assembly by means of the screws 130.

The circumferentially spaced spring pin assemblies 128 forcefully urge the spring guide plate 118 into forceful engagement against the pressure plate 110. This force frictionally locks the pressure plate 110 with the output hub assembly 90-108 via the friction material 98. Accordingly, input torque provided by an input shaft received in the bore 86 is transferred to the output sprocket 106 via the output hub assembly 90-108, except in such instances when the input torque exceeds the torque limit established between the pressure plate 110 and the friction surface 98, such limit being established by the number and nature of the spring pin assemblies 128. When such limit is exceeded, a differential in relative rotational movement between the input hub and output hub is experienced by virtue of the bearing assembly 90.

Of particular interest to the concept of the invention is the structure of the spring pin assemblies 128, shown in detail in FIG. 6. Each includes a pin 136, having an enlarged head 138 at one end thereof. The diameter of the head is substantially equal to that of the holes 126 in the back plate 122. The opposite end of the pin 136 is appropriately machined or grooved to receive a keeper or retaining ring 140. This end of the pin 136 is of similar diameter to the holes 120 for receipt therein.

In constructing the spring pin assemblies 128, a washer 142 is placed over the pin 136 and brought to rest on the head 138. The helical spring or springs are then placed over the pin 136 to rest upon the washer 142. In the embodiment shown, there is an outer spring 144 and an inner spring 146, the two in combination providing the required spring force. Of course, if the outer spring 144 were sufficient for this purpose, a sleeve could be placed over the pin 136 as depicted in FIG. 1. The springs 144,146 are then compressed against the washer 142 to a predetermined load force. Sufficient shim washers 148 are then added such that when the washer 150 is placed in position, the groove for the keeper 140 is accessible. The keeper is then affixed to the pin 136 and a completed spring pin assembly 128 has been accomplished.

In constructing the spring pin assemblies 128, the springs are significantly pre-compressed, typically on the order of 40-50%. This large degree of pre-compression is such that the spring will closely maintain its axial force while adjusting for friction material wear.

It will be appreciated that by varying the size and/or number of springs 144,146 used in the construction of the assemblies 128, the spring assemblies 128 can be designed to impart any of a variety of predetermined forces. Accordingly, there can be pre-manufactured a large plurality of such spring pin assemblies for selection at the time of assembly of the clutches 80.

Consider now the assembly of the clutch unit 80. The friction disk 96 with bonded friction surface 98 is first placed over the axial portion 82 of the input hub. The bearing assembly 90 is then placed over this portion of the hub and maintained by the keeper 92 as discussed above. The spacer 108 is then positioned over the bearings 90 and the sprocket 106 or other coupling means is affixed to the disk 96 by means of the cap screws 104. With the output portion of the clutch 80 completed, the annular pressure plate 110 is placed over the circumferential flange portion 84 of the input hub and is secured thereto by the placement of keys 112. The spring guide plate 118 is then placed over the axial portion 82 of the input hub and rested upon the back side of the pressure plate. A 13. selected plurality of spring pin assemblies 128 is then evenly positioned about the spring guide plate 118 by reception in the holes 120. The back plate 122 is then positioned such that the holes 126 receive the heads 138 of each of the assemblies 128. Flathead cap screws 130 are then threaded into the flange portion 84 to home the back plate 122 against the shoulder 124 of the axial hub portion 82. This homing compresses the springs 144,146 of the spring pin assemblies 128 as shown in FIG. 4, with the heads 138 becoming flush with the outside surface of the plate 122. Springs 144,146 then urge the pressure plate 110 into forceful engagement with the friction material 98 for operation as discussed above.

As can be seen, the clutch assembly of FIGS. 4 and 5 is small in size and is easily assembled. The preassembled spring pin assemblies 128 are placed in position by reception in holes and are activated in the embodiment shown by tightening of two cap screws 130. As can further be seen, replacement of a broken spring pin assembly 128, or replacement of the friction disk and friction surface 96,98 is a simple matter.

Also provided as a novel feature of the invention is the centralized positioning of locking means for securing the input shaft in the bore 86. This allows the accommodation of various lengths of shafts, inserted from either end of the bore 86. As shown in FIG. 4, a bore 152 is provided in radial extension into the pressure plate 110. The bore 152 is aligned with a threaded bore in the flanged hub portion 84 to receive a setscrew 154. By inserting an Allen wrench or other appropriate tool in the bore 152, the setscrew 154 can be brought into tight secured engagement with a key received in the keyway 88. While not shown specifically in the drawings herein, it is also contemplated as a portion of the invention that a bore similar to the bore 152 be provided to make access to a setscrew passing through the flanged portion 84 of the input hub to make secured engagement with the input shaft itself. As a novel feature of the invention, access to securing means is provided centrally with respect to the clutch 80 when considered as a whole. More particularly, access is made through the pressure plate itself.

Also included as a novel feature of the invention is the implementation of a wear indicator, giving visual indicia of the state of wear of the surface 98. The wear indicator includes a piston 156 passing through a hole in the back plate 122. A spring 158 is engaged between the back plate 122 and shoulder 160 on the pin 156. The spring 158 urges the pin 156 against the pressure plate 110, the pin 156 passing through a hole 162 in the spring guide plate 118. In the preferred embodiment, the pin 156 is of such length that it protrudes beyond the back plate 122 a distance equivalent to the amount of allowable wear in the wear surface 98. Accordingly, when the wear surface 98 has worn its allowed amount, the pin 156 becomes flush with the back plate 122, advising the operator that servicing or refurbishing of the clutch assembly 80 is due. Of course, the end of the pin 156 could even be calibrated if desired.

It should, however, be appreciated that even in the absence of the wear indicator, a loss of operational capability of the clutch 80 is automatically experienced when the friction surface 98 has worn to a degree sufficient to allow the head 138 to abut the washer 142 in a fashion somewhat similar to that of the embodiment of FIG. 1. Accordingly, a termination of operation of the clutch 80 is experienced before any damage can be done to the unit by excessive wear. In a preferred embodiment of the invention, the wear capability of the friction surface 98 is approximately ⅛ inch. In expanding to accommodate such wear, the force imparted by the spring pin assemblies 128 diminishes by only about ten percent. Accordingly, the torque limiting capabilities of the clutch 80 remain rather constant over the wear life thereof.

While in accordance with the patent statutes only the best modes and preferred embodiments of the invention have been presented and described in detail, it is to be understood that the invention is not limited thereto or thereby. Accordingly, for an appreciation of the true scope and breadth of the invention, reference should be had to the appended claims.

What is claimed is:
1. A torque limiting clutch, comprising:
an input hub;
an output hub assembly;
a friction disk and pressure plate in interconnection between said input hub and output hub assembly; and
a plurality of spring assemblies in forceful operative engagement between said input hub and said pressure plate, each said spring assembly comprising:
a pin having a head at a first end thereof;
a spring maintained upon said pin;
a retaining ring received within a groove at a second end of said pin for compressively retaining said spring upon said pin at a predetermined load be provision of washers between said spring and one of said ends; and
a back plate received by said input hub, said back plate having a plurality of holes therein for receiving said first end of said pins, said back plate being maintained in fixed relation to said input hub.

2. The torque limiting clutch according to claim 1 which further includes a guide plate in engagement with said pressure plate, said guide plate having a plurality of holes spaced thereabout for receiving said second end of said pins.

3. The torque limiting clutch according to claim 1, wherein said input hub is characterized by an axial bore passing completely therethrough, and wherein locking means are provided centrally along said input hub for axially securing an input shaft in said bore.

4. The torque limiting clutch according to claim 3 wherein said pressure plate includes a radially extending passage in alignment with said locking means for providing access thereto.

5. The torque limiting clutch according to claim 1 which further includes means in communication with said pressure plate for indicating the state of wear of said friction disk.

6. The torque limiting clutch according to claim 5, in which said means for indicating wear comprises a piston springbiased against said pressure plate and having a portion thereof extending from a fixed reference plane.

7. The torque limiting clutch according to claim 1 in which said friction disk is characterized by a plurality of threaded holes therein and is mounted upon and rotatable with a bearing.

8. The torque limiting clutch according to claim 7 which further includes output drive means threadedly connected to said friction disk at said holes.

9. The torque limiting clutch according to claim 8 wherein said output drive means comprises a sprocket.

10. A torque limiting clutch, comprising:
an input hub;
a pressure plate operatively connected to and rotatable with said input hub;
an output hub assembly rotatably mounted upon said input hub and in forceful frictional engagement with said pressure plate;
spring means operatively interposed between said input hub and said pressure plate for forcefully urging said pressure plate against said output hub assembly; and
wherein said input hub has an axial bore therethrough for receiving an input shaft, a setscrew communicating with said bore, and wherein said pressure plate includes a radially extending passage accessing said setscrew.

11. The torque limiting clutch as recited in claim 10 wherein said spring means comprises a pin having washers at each end for retaining thereon a compressed helical spring.

12. The torque limiting clutch as recited in claim 11 further includes a piston in constant spring-biased engagement with said pressure plate and indicating the position of said pressure plate with respect to said input hub.

* * * * *